Mar. 6, 1923.
F. G. HIRST
1,447,177
LEAF SPRING LUBRICATING DEVICE
Filed May 18, 1921
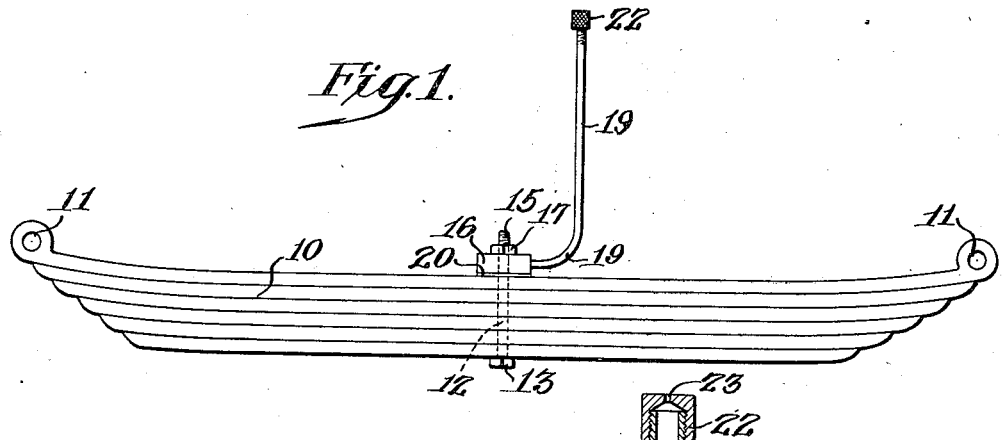
Fig.1.
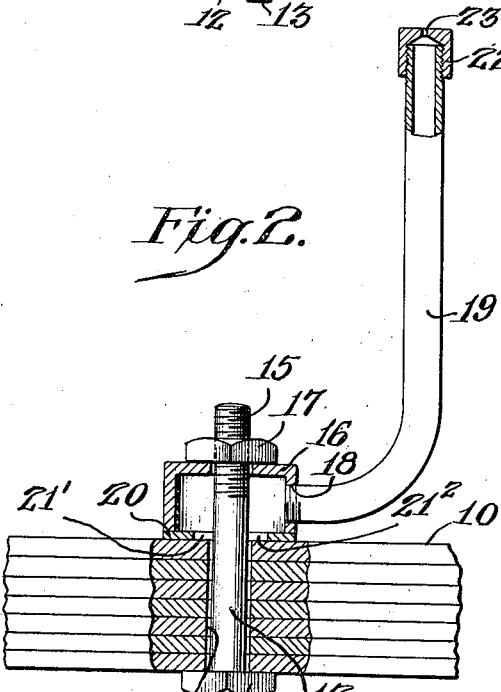
Fig.2.
Fig.3.
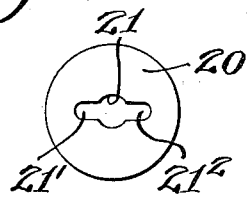
Witness:
Walter Chiny
Inventor:
Franklin G. Hirst.
by M. van Doostveer
his Attorney.

Patented Mar. 6, 1923.

1,447,177

UNITED STATES PATENT OFFICE.

FRANKLIN G. HIRST, OF PHILADELPHIA, PENNSYLVANIA.

LEAF-SPRING-LUBRICATING DEVICE.

Application filed May 18, 1921. Serial No. 470,633.

*To all whom it may concern:*

Be it known that FRANKLIN G. HIRST, a citizen of the United States, residing at Philadelphia, in the county of Philadelphia and State of Pennsylvania, has invented certain new and useful Improvements in Leaf-Spring-Lubricating Devices, of which the following is a specification.

My invention relates to leaf spring lubricating devices, and especially to the supply and distribution of lubricant to the individual leaves of vehicle springs and the like. For this purpose, I aim to utilize a bolt hole through the spring leaves as a lubricant channel, and to supply the lubricant to this channel by means mounted and secured on one end of the bolt. My present invention is in some respects a simplification or improvement of the device shown in my patent application, Serial No. 458,380, filed April 4, 1921, entitled "Leaf spring lubricating device."

The embodiment and application of my present invention hereinafter described are the best and most advantageous known to me, being simple in construction; relatively inexpensive to manufacture; very easily mounted or installed on springs already in use; and durable, convenient, and effective in service. It will be understood, nevertheless, that the invention can be otherwise embodied and applied.

In the drawings, Figure 1 is a front elevation of an ordinary conventional form of elliptical type of automobile spring with my lubricating device applied thereto.

Fig. 2 is a fragmentary front view, partly in section, on a larger scale.

Fig. 3 is a plan view of a washer or gasket shown in Figs. 1 and 2.

The leaf spring 10 shown has the usual eyes 11, 11 at its ends, for attaching it to the hangers of an automobile or other vehicle body. A bolt 12 with head 13 extends up through the central bolt hole 14 in the set of leaves, and serves to secure them together in the usual manner. The screw threaded free end 15 of the bolt 12 projects above the topmost leaf sufficiently to take a hollow collar part or receptacle 16 (in form resembling an inverted cup), as well as a removable bolt head member or nut 17 beyond said receptacle. Thus the bolt 12 secures and clamps the receptacle 16 in place against the spring 10.

Into a threaded opening 18 in one side of the receptacle 16 is screwed a lubricant-conveying pipe 19, bent to extend vertically upward. Between the topmost spring leaf and the bottom edge of the receptacle 16 is interposed a flat annular gasket or washer 20, of any suitable material. The gasket 20 has a round central opening 21 to take and engage the bolt 12, and to center the gasket thereon; and this opening is extended to either side of the bolt, at 21′ and 21² (Figs. 2 and 3), to afford passage for lubricant from the receptacle 16 (which is open adjacent the spring more than sufficiently for this purpose) down through the bolt holes 14, via the channel afforded by the usual clearance around the bolt 12. From this channel along the bolt 12, the lubricant is distributed between and along the individual spring leaves, so as to lubricate them effectually.

A cap 22 with a vent or oil hole 23 is screwed on the upper end of the pipe 19, to prevent clogging of the pipe by dirt. The pipe 19 extends well above the topmost portion of the spring 10, and thus affords gravity head sufficient to cause the lubricant to ascend to the highest point of the top leaf.

In applying the device to a spring already in service, all that one need do is to unscrew the nut from the usual leaf-securing bolt; replace the latter (if of insufficient length) by a longer bolt 12; put the gasket 20 and the receptacle 16 in place; and screw down the nut 17 on the receptacle to clamp and hold all the parts securely together and to make a tight joint.

The effective internal lubrication of the spring 10 afforded by my device serves to minimize breakage of springs (which is generally due to lack or inadequacy of lubrication), besides making the vehicle ride much more smoothly.

Having thus described my invention, I claim:

1. The combination with a leaf spring, of a lubricant receptacle thereon for lubricating its leaves; and a securing bolt extending through the spring leaves and said receptacle, with a head member beyond the latter securing it in place.

2. The combination with a leaf spring, of a cup-like lubricant receptacle thereon open adjacent the same; a securing bolt extending through the spring leaves and said receptacle, with a channel for lubricant therealong, and a head member beyond the receptacle securing the latter in place; and a washer interposed between said receptacle and said spring affording passage for lubricant into said channel.

In testimony whereof I affix my signature.

FRANKLIN G. HIRST.